M. BIELENBERG.
HEDGE TRIMMING MACHINE.
APPLICATION FILED MAY 12, 1909.

954,667. Patented Apr. 12, 1910.

Witnesses

Inventor
Markus Bielenberg

UNITED STATES PATENT OFFICE.

MARKUS BIELENBERG, OF SANKT MARGARETHEN, GERMANY.

HEDGE-TRIMMING MACHINE.

954,667.  Specification of Letters Patent. Patented Apr. 12, 1910.

Application filed May 12, 1909. Serial No. 495,477.

*To all whom it may concern:*

Be it known that I, MARKUS BIELENBERG, a subject of the King of Prussia, and resident of Sankt Margarethen, in the Province of Schleswig-Holstein, Germany, have invented a new and useful Hedge-Trimming Machine, of which the following is a specification.

The present invention relates to a machine for trimming hedges and trees in vertical and horizontal, as well as in inclined and curvilinear directions.

Special objects of the invention are to simplify and cheapen the construction and to render more efficient serviceable and durable in operation devices of the kind referred to.

With these ends in view the invention consists in the novel combination, arrangement and adaptation of parts, all as more fully hereinafter explained, shown in the accompanying drawings and then specifically set out in the appended claims.

Figures 1, 2, 3:
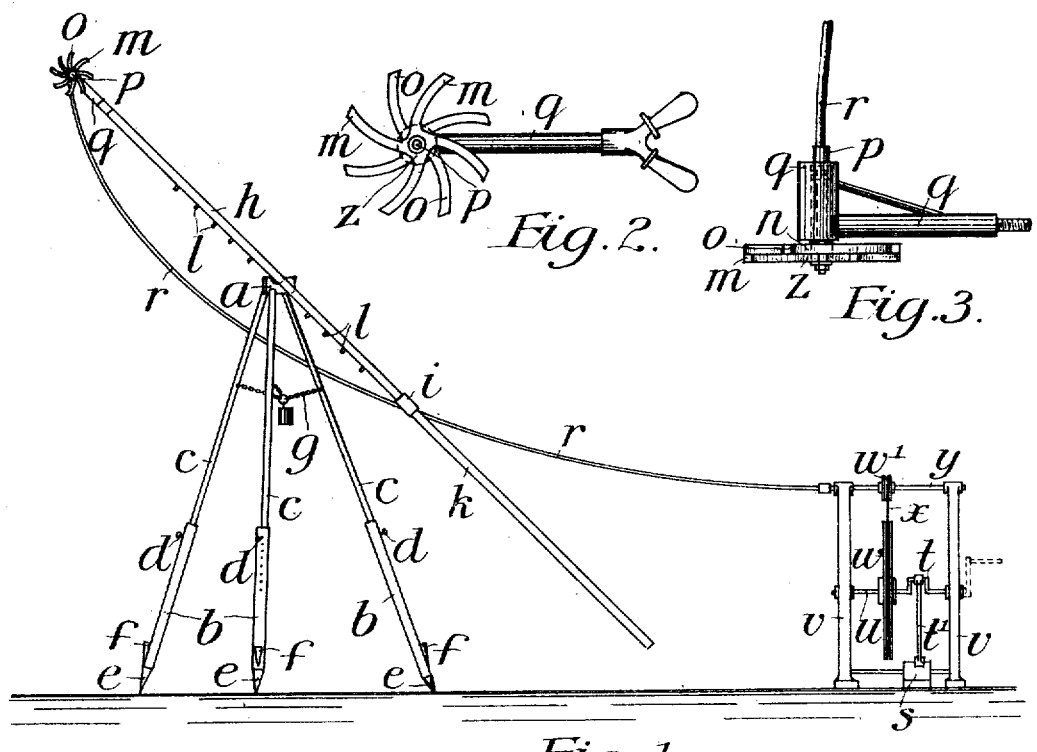
Figures 4, 5, 6:
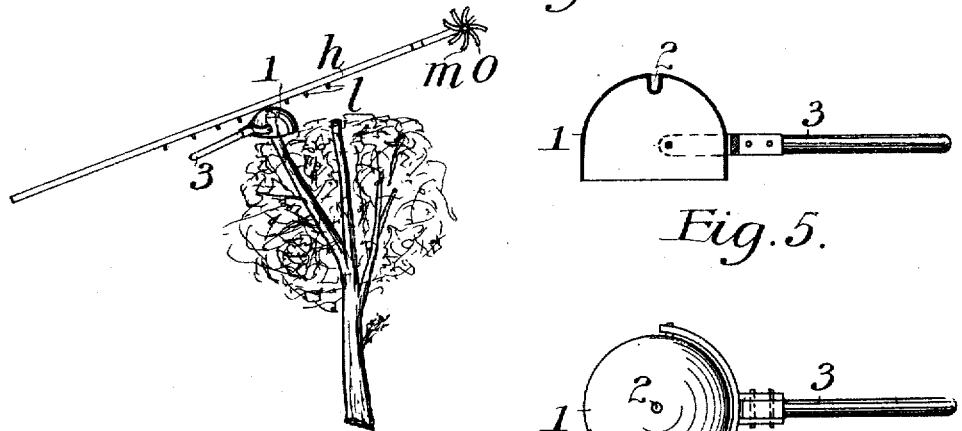

In the drawings Figure 1 shows the hedge trimming machine fitted up ready for use. Fig. 2 shows the cutting device in a separate view Fig. 3 represents a plan view of Fig. 2 Fig. 4 illustrates a special manipulation of the cutting device Figs. 5 and 6 show details of construction.

The hedge trimming machine consists essentially of four parts, of a tripod supporting structure or trestle, of a rod pivoted in the aforesaid trestle so as to be movable in all directions, of a cutting mechanism at the top end of the aforesaid rod and of a source of energy for actuating the cutting mechanism.

The supporting structure consists of a tripod trestle, the feet of which are pivoted in the bearing $a$. It is advisable to employ telescoping feet, which enable the trestle to be firmly fixed in the desired height on plane or uneven ground.

In the drawing the lower sections of the telescoping feet are denominated $b$, the upper sections, which engage the tubular lower sections, being denominated $c$. By means of a cotter pin $d$, or of a clamping device of any desired suitable construction, not shown, the two sections $b$, $c$ of the feet can be fixed in the required correlative position. The lower sections $b$ terminate in spikes $e$ provided with an abutment $f$ for driving the spikes into the ground by stamping with the foot thereon or by hammer blows, so that the trestle can be rigidly supported.

A chain $g$ interconnecting the feet of the trestle prevents the feet from being turned outwardly beyond a certain angle. In the middle of this chain $g$ is hung up a weight which holds the chain taut.

The trestle serves for supporting the cutting device in such a manner that the latter may be conveniently handled from the ground.

A rod $h$, adapted to carry the cutting device at its top end, is provided at its lower end with a tubular socket $i$ for the insertion of a handle $k$. This rod $h$, which may be built up of a number of sections, if desired, can be pivotally supported in the bearing $a$ at the top of the trestle. In order to lock the rod $h$ against axial displacement, when same is being actuated from the ground, a socket is provided in the bearing $a$ permitting the engagement of a stud $l$ on the rod $h$. The pivotal connection effected by the engagement of the stud $l$ in the aforementioned socket enables the rod $h$ to be turned in all directions in managing the work of the cutting device, to be described in detail later on. To render possible the axial adjustment of the rod $h$ in its pivotal socket, in accordance with the work to be performed by the cutting device, a number of studs $l$ may be arranged on the rod $h$ at suitable distances apart.

The cutting device comprises a pair of stellated cutting blades mounted on a common spindle. One of these blades, in the example shown in the drawing the blade $z$ provided with the knives $m$ is rotatably supported, while the second blade $n$ provided with the knives $o$ is fixed. The leaves twigs and light branches of the hedge or tree to be trimmed engaging the open spaces between the knives $m$ and $o$ are cut on imparting a rotary motion to the blade $z$. To secure the twigs and light branches against withdrawal from between the knives $m$ and $o$ either the knives $m$ alone or both knives $m$ and $o$ are fitted with curved cutting edges, as shown in Fig. 2.

The motive power is imparted to the rotary knife blade $z$ from the shaft $p$, which is journaled in a bracket $q$ fixed at the top end of the rod $h$. The free extremity of the shaft $p$ is connected to a flexible shaft $r$ coupled with a driving shaft of the source of energy. The flexible shaft $r$ is chosen of such a length, that the effective work of the cutting device is rendered possible at the various heights reached by the proper adjustment of the rod $h$ in its pivotal socket.

The cutting or trimming operation is directed or managed from the ground by suitably manipulating the handle $k$ of the rod $h$.

In machines for trimming trees, which are necessarily of stronger construction, a fly wheel may be fixed on the free extremity of the shaft $p$. The momentum which the fly wheel attains in rapidly rotating the knife blade $z$ assists in cutting even thicker branches.

The source of energy for rotating the knife blade $z$ is represented in the drawing by a treadle motor. The oscillatory motion of the treadle lever $s$ is translated into a continuous circular motion of the shaft $u$ by means of a crank $t$ and pitman rod $t^1$. The drive gear just described is mounted in a bracket or frame $v$ easily portable and adapted to provide a firm basis. A pulley $w$ on the drive shaft $u$ which pulley may simultaneously serve as a fly wheel, is in connection with the pulley $w^1$ of smaller diameter on the shaft $y$ by means of an endless belt $x$ or the like. Coupled to the shaft $y$ is the flexible shaft $r$ for imparting rotary motion to the knife blade $z$.

The crank shaft $u$ is advantageously arranged so as to receive a hand crank as indicated in dotted lines in Fig. 1, should it be desired to utilize manual power in driving the machine.

Circumstances permitting, electric or other power may be employed as a driving agent.

When the machine is required for trimming low hedges and trees, the tripod trestle may be dispensed with. In this instance the cutting device is separated from the rod $h$ and fitted with a forked handle, as shown in Fig. 2, for manipulating the cutting device directly.

In cutting or trimming big trees in horizontal directions, the cutting device is manipulated by means of a suitably long rod $h$ from a ladder or the like. To relieve the operator, a semi-spherical socket 1 is placed with the concavity on an upstanding branch to gain a supporting basis for the rod $h$, the latter with one of its studs $l$ engaging a depression 2 in the top of the socket 1. A handle 3 facilitates the displacement of the socket 1 when required.

To protect the cutting mechanism from down falling branches and the like, a hood or cap (not shown in the drawing) may be arranged for housing the drive gear.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims, or of mechanical equivalents to the structure set forth.

What I do claim as my invention, and desire to secure by Letters Patent, is:

1. A machine for trimming hedges and trees comprising a pair of stellated cutting blades mounted adjacent to one another, a shaft rendering one of said cutting blades rotatable, a separable rod for carrying the cutting device and directing same in its work from the ground, means for pivotally supporting said rod, a trestle affording the said pivotal support, a flexible shaft coupled with the said driving shaft of the rotary cutting blade and means for imparting a rotary motion to the flexible shaft, substantially as described and shown.

2. In a machine for trimming hedges and trees of the nature set forth, a cutting mechanism, a rod carrying the cutting mechanism and serving for manipulating same, a number of studs on said rod at distances apart, an elevated support for resting the rod thereon in its manipulation from the ground, a socket in connection with the said elevated support for the engagement of one of the studs on the said rod, so as to attain a pivotal connection rendering the rod dirigible in all directions, substantially as described and shown.

3. In a machine for trimming hedges and trees of the nature set forth, a cutting mechanism, a rod carrying the cutting mechanism and serving for manipulating same, a number of studs on said rod at distance apart, an adjustable tripod trestle for resting the rod thereon in its manipulation from the ground, a socket in connection with the said adjustable tripod trestle for the engagement of one of the studs on the said rod, so as to attain a pivotal connection rendering the rod dirigible in all directions, substantially as described and shown.

In witness whereof I have hereunto signed my name this 30 day of April 1909, in the presence of two subscribing witnesses.

MARKUS BIELENBERG.

Witnesses:
LEOPOLD SKANCTZKI,
ERNEST H. L. MUMMENHOFF.